United States Patent [19]

Kozono

[11] Patent Number: 4,774,106
[45] Date of Patent: Sep. 27, 1988

[54] METHOD OF APPLYING PARTICULATE MATERIAL TO OBJECTS BY USING A LIQUID

[75] Inventor: Takashi Kozono, Narashino, Japan

[73] Assignee: Pacific Machinery & Engineering Co., Ltd., Tokyo, Japan

[21] Appl. No.: 940,585

[22] Filed: Dec. 12, 1986

[30] Foreign Application Priority Data

Dec. 13, 1985 [JP] Japan .................. 60-279227

[51] Int. Cl.$^4$ ..................... B05D 7/24; B05D 7/14
[52] U.S. Cl. ................................ 427/202; 228/206; 228/207; 228/223; 427/204; 427/310; 427/348
[58] Field of Search ............... 427/180, 202, 204, 208, 427/348, 310; 228/206, 207, 223

[56] References Cited

U.S. PATENT DOCUMENTS

| 255,344 | 3/1982 | Small .................................. 427/202 |
| 3,329,523 | 7/1967 | Best et al. ........................... 427/348 |
| 4,089,723 | 5/1978 | Williams ......................... 427/205 X |
| 4,200,670 | 4/1980 | Albach ............................ 427/202 X |
| 4,327,124 | 4/1982 | Des Marais ..................... 427/205 X |

FOREIGN PATENT DOCUMENTS 19233 of 1910 United Kingdom .

Primary Examiner—Shrive Beck
Attorney, Agent, or Firm—Kane, Dalsimer, Sullivan, Kurucz, Levy, Eisele and Richard

[57] ABSTRACT

A method of applying a material of particulate form to the surface of an object by using a liquid, wherein the liquid is applied to the surface of the object to provide a film of the liquid thereon, and then the material of particulate form is applied to the film of the liquid on the surface of the object. Excess liquid may be removed from the surface of the object by using a jet of air current before the material of particulate form is applied to the film of the liquid on the surface of the object.

2 Claims, 1 Drawing Sheet

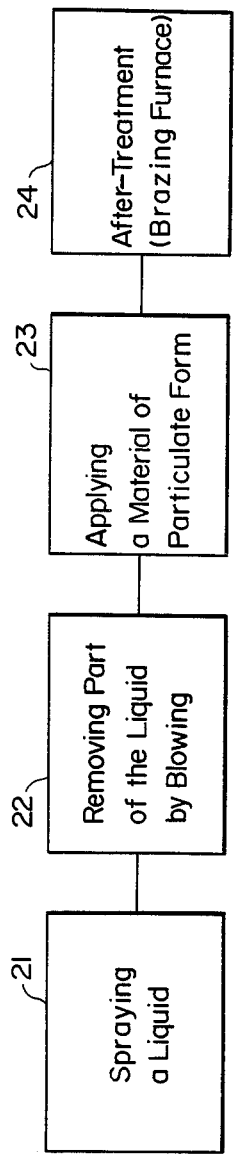
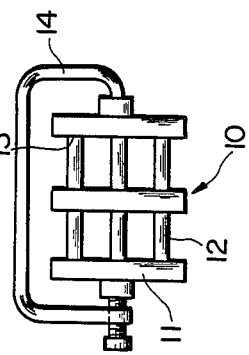
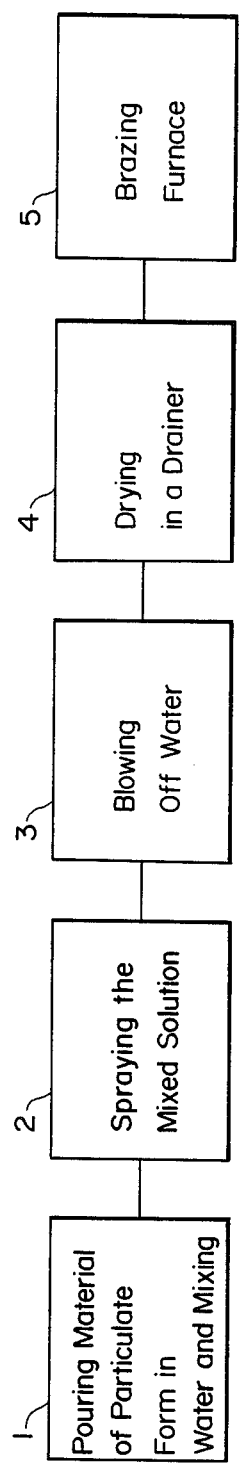

METHOD OF APPLYING PARTICULATE MATERIAL TO OBJECTS BY USING A LIQUID

BACKGROUND OF THE INVENTION

This invention relates to method of applying particulate material to objects, and more particularly it is concerned with a method of applying a material of particulate form to an object by using a liquid.

The method of applying a material in particulate form by using a liquid has been widely in use in various fields of industry. One example of the method which is used nowadays to apply a flux of particulate form to members of nonferrous metallic material to join them together by brazing will be described by referring to a block diagram shown in FIG. 3. In this method, a flux of particulate form is poured in water (filtered water or water subjected to ion exchange to provide pure water) to cause same to disperse or dissolve in the water (step 1). Then, the dispersion or solution is sprayed onto metallic members by means of a spray-gun (step 2). Excess water is removed by allowing same to drip down or by means of an air blower (step 3), and the metallic members are placed in a strainer to dry same by using a burner (step 4). Thereafter, the metallic members are placed in a brazing furnace to join them together by heating a brazing material that has been applied beforehand to portions of the metallic members at which they are to be joined together.

Some disadvantages are associated with this method of the prior art of applying particulate material to metallic members or components. When excess water is removed, a substantial quantity of flux would be lost together with the removed water when water is allowed to drip down or dried by blowing air thereagainst. Thus the fluxes of particulate form that are used would be lost in large quantities, and, in addition, difficulty would be experienced in distributing the flux uniformly on the surfaces of the metallic components to be joined together by brazing.

SUMMARY OF THE INVENTION

This invention has been developed for the purpose of obviating the aforesaid problems of the prior art. Accordingly, the invention has as its object the provision of a method of applying a material of particulate form to the surface of an object by using a liquid which enables the material of particulate form to be applied uniformly to the surface of the object while minimizing the loss of the material.

To accomplish the aforesaid object, the invention provides a method wherein a liquid is applied to the surface of an object, and a material of particulate form is applied, directly or after excess liquid is removed by a jet stream of air, to a film of the liquid formed on the surface of the object.

The method according to the invention offers many advantages. The need to pour the material of particulate form in a liquid to form a suspension or a solution is eliminated, so that the disadvantage that the material of particulate form might be used in excessively large quantities can be avoided because the material of particulate from has only to be applied in a necessary quantity after the liquid is applied to form a liquid film on the surface of the object. This is conducive to a reduction in costs because the quantities of the material of particulate form and the liquid that are used can be minimized. Moreover, it is possible, according to the invention, to uniformly apply the material of particulate form to the surface of the object with ease and to vary, when necessary, the density of the material of particulate form applied to various surface portions of the object to increase the thickness of an applied coat of material in necessary surface portions. The material of particulate form that might drop without adhering to the surface of the object after being applied can be recovered by a dust collector or a recovery device for further use. According to the method of the invention, the drying step in which a drainer is used can be eliminated, making it possible to save energy that might otherwise be wasted in performing the drying step.

BRIEF DESCRIPTION OF THE DRAWINGS

FIG. 1 is a block diagram showing the process steps to be followed in performing the method of applying a material of particulate form comprising one embodiment of the invention;

FIG. 2 is a plan view of one example of an object or structure on which brazing can be performed by the method according to the invention; and FIG. 3 is a block diagram showing the process steps to be followed in applying a material of particulate form to an object by a method of the prior art.

DETAILED DESCRIPTION OF THE PREFERRED EMBODIMENT

A preferred embodiment of the invention in which the method of applying a material of particulate material by using a liquid is used for applying a flux of particulate form to components of nonferrous metal which are to be joined together by brazing will be described by referring to FIG. 2. In FIG. 2, there is shown a structure generally designated by the reference numeral 10 comprising three members 11, and a plurality of connectors 12 interposed vertically between the members 11. The structure 10 has a brazing material applied thereto by plating. The members 11 and connectors 12 are assembled together by a gripper. In step 21, a liquid, which may be water in this case, is sprayed onto the entire surface of the structure 10. In step 22, excess water is removed by means of an air blower when the quantity of the applied water is too large, to form a thin film of water on the surface of the plating of brazing material on the surface of the structure 10. Step 22 can be eliminated when the water sprayed onto the entire surface of the structure 10 is enough to form a suitably thin film. Then, in step 23, a flux of particulate form is applied to the film of water on the plating of brazing material on the surface of the structure 10, and, in step 24, the structure 10 is placed in a brazing furnace where it is heated in a vacuum, so that the members 11 of the structure 10 are joined to the connectors 12 by brazing as indicated at 13.

The embodiment shown and described hereinabove has been described as using water as a liquid for applying a flux of particulate form to the structure 10 in a brazing step. It is to be understood, however, that the invention is not limited to this specific form of the embodiment, and that the method according to the invention can also have application in applying enamel of particulate form to surfaces of metals, glass or pottery by using, as a liquid, water or water added with an additive, in producing enameled articles. The method according to the invention can also have application in providing a coating of nonferrous metal on the surface of a sheet steel by using, as a liquid, water added with a solvent, to improve the quality and appearance of the coating.

What is claimed is:

1. A method of brazing two or more non-ferrous metallic parts having a brazing material applied thereto comprising the steps of:

spraying water onto said temporary assembly of parts whereby to form a water film on said temporary assembly surface which serves as a temporary adhesive to adhere flux particles to said surface;

applying a flux in particulate form onto said water film covering said surface; and placing said assembly of parts into a brazing furnace.

2. A method in accordance with claim 1 comprising a further step of blowing a jet of air onto said temporary assembly after spraying the same with water whereby to remove any excess water.

* * * * *